Oct. 13, 1942.                A. C. HOFFMAN                    2,298,379
                        EXPANDER TOOL FOR COUPLINGS
                          Filed May 26, 1939            3 Sheets-Sheet 2

Inventor
Allan C. Hoffman
By Mawhinney & Mawhinney
Attorneys.

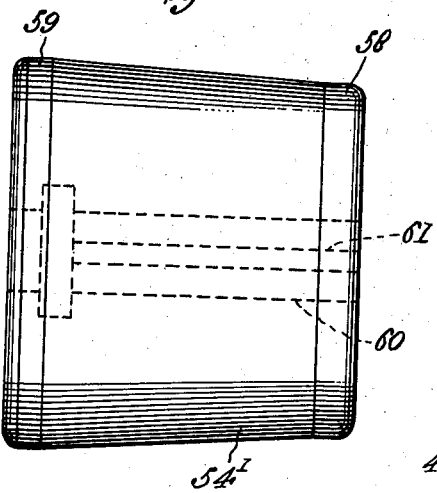
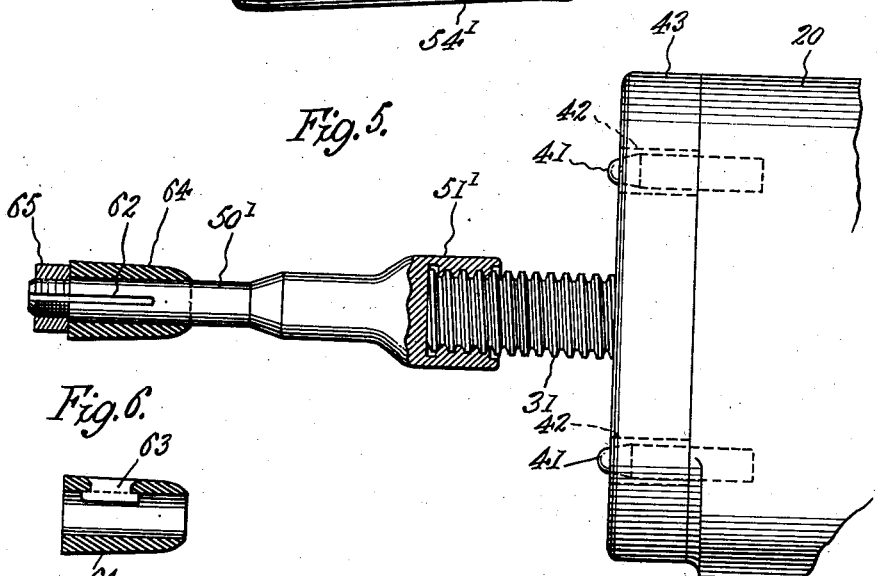
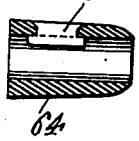
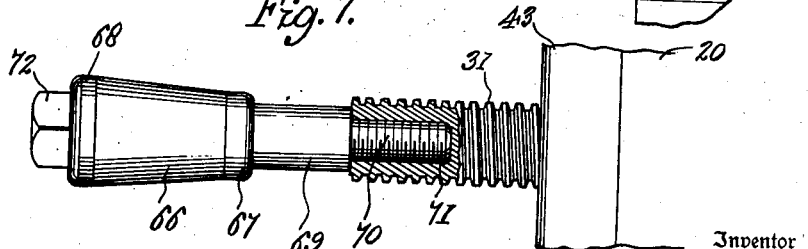

Patented Oct. 13, 1942

2,298,379

UNITED STATES PATENT OFFICE 2,298,379

EXPANDER TOOL FOR COUPLINGS

Allan C. Hoffman, Milldale, Conn., assignor to Scovill Manufacturing Company, Waterbury, Conn., a corporation of Connecticut Application May 26, 1939, Serial No. 276,027

6 Claims. (Cl. 29—88.2)

The present invention relates to expander tools for assembling coupling members to hose, and the like.

An object of the invention is to provide a tool of this type which operates to draw the expander ball or head through the shank of the coupling member from the inner end thereof outwardly to place the metal of the expanding shank under compression instead of tension to prevent the shank from being torn from the body of the coupling; to cause the end of the hose to creep over the shank into tight sealing position in the coupling member; and to free the hose and the coupling member of the expander immediately as the coupling is made.

Another object of the invention is to provide a tool construction with a thrust bearing so disposed outside the frame parts that the bearing has ample room for a relatively large size bearing to withstand the heavy strains imposed on the bearing during the drawing and expanding action; a tool structure wherein a number, for example four, of radial handles may be employed for operating the expander by an operator standing at one side of the tool and manipulating the tool by a hand over hand action; a set of interchangeable floating thrust plates for the tool designed to accommodate couplings of different sizes and shapes, the thrust plates being self centering to compensate for inequalities in the flanges or nuts of the coupling members employed; and an expander head for the tool which has an intermediate tapering portion to effect expansion of the shank, a smaller cylindrical end to center the head in the end of the shank, and a larger cylindrical end to hold the expanded shank while setting, the conical head being frictionally held against turning, particularly with small diameter heads, and reducing the resistance to the axial drag of the head during the expanding operation.

With the foregoing and other objects in view the invention will be more fully described hereinafter, and will be more particularly pointed out in the claims appended hereto.

In the drawings, wherein like symbols refer to like or corresponding parts throughout the several views, Figure 1 is a vertical longitudinal section taken centrally through an expander tool, showing a coupling member in position therein and relative to the end of a hose ready for operation of the tool;

Figure 4 is a detail side elevation of a modified form of expander head adapted to be mounted on the key shaft of Figures 1, 2 and 3;

Figure 5 is a fragmentary sectional view in side elevation of an expander tool, showing a slightly modified form of key shaft and expander head thereon;

Figure 6 is a detail sectional view taken lengthwise through the form of expander head in Figure 5, showing the key in the head, and Figure 7 is a fragmentary sectional view in side elevation of a portion of the expander tool, showing another modified form of an expander head having the supporting shaft as a part thereof.

Figure 1:
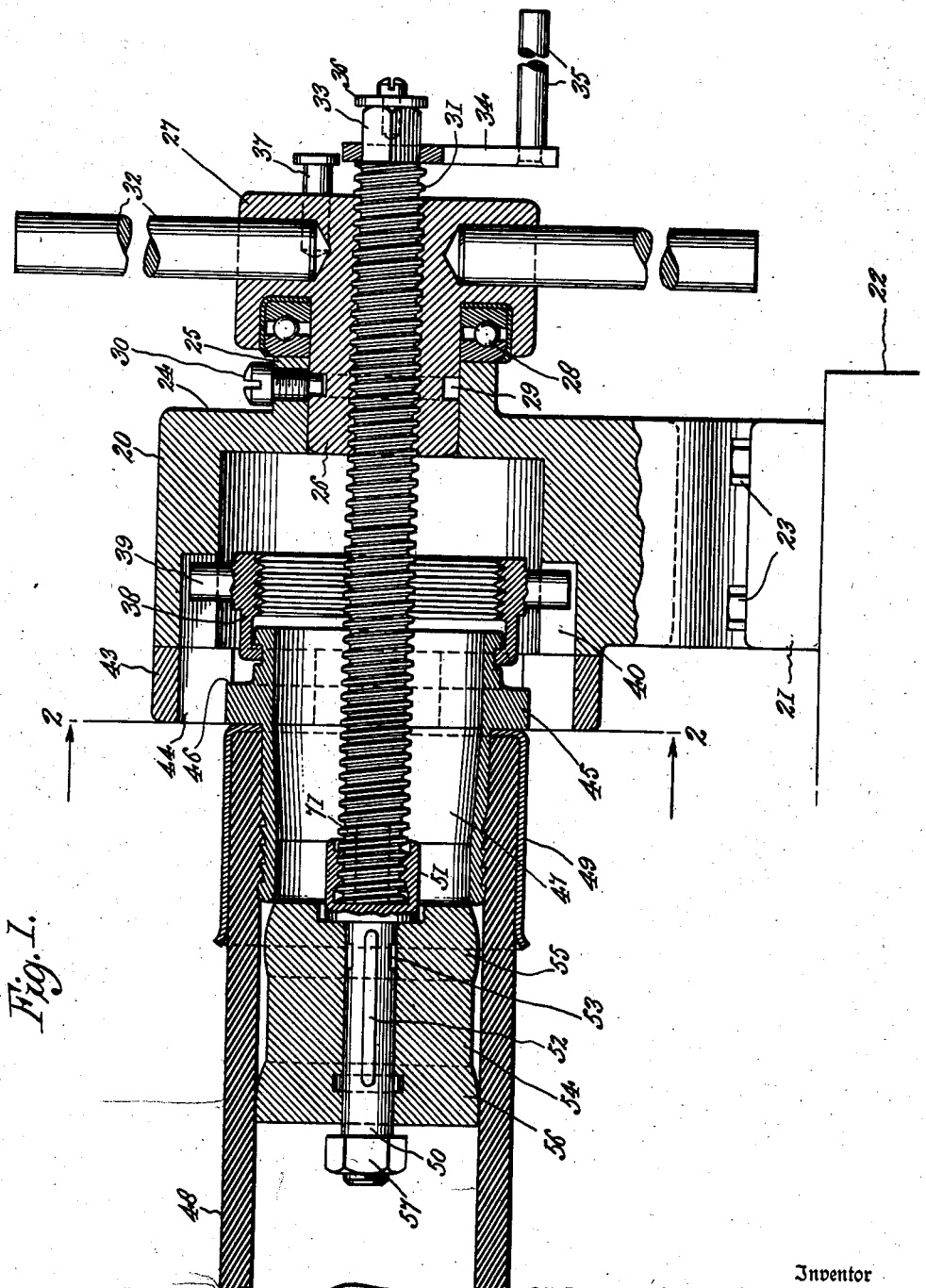
Figure 2:
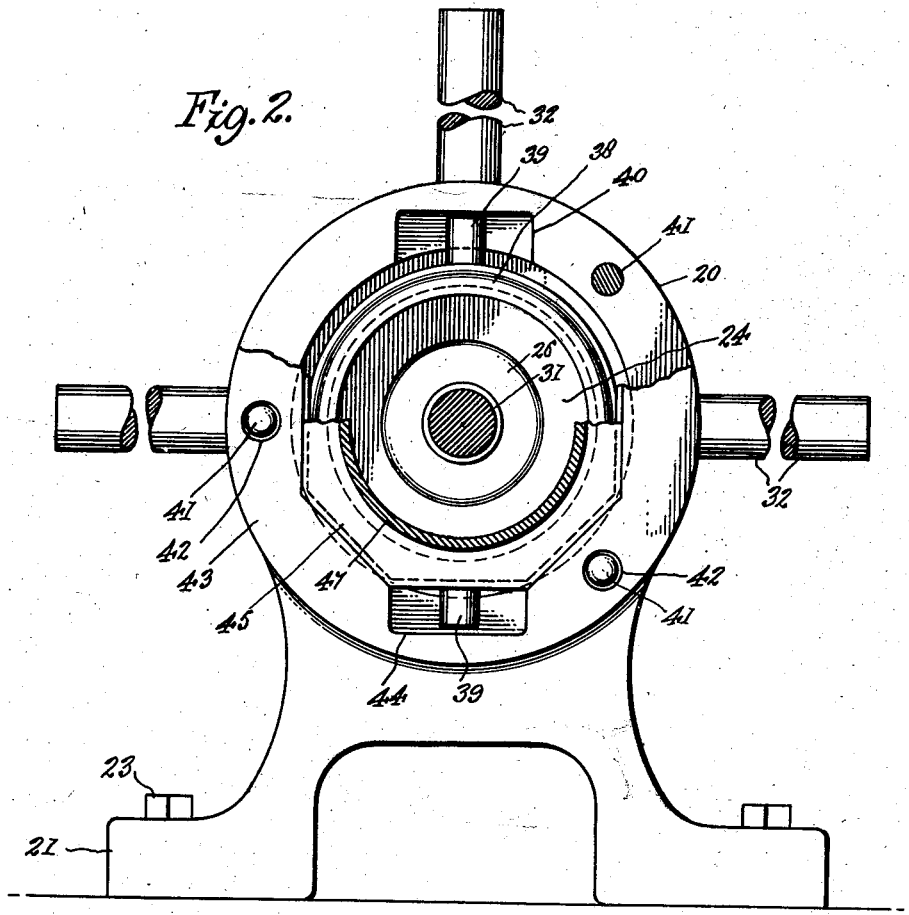
Figure 2 is a transverse section taken through the same substantially on the line 2—2 of Figure 1, parts being broken away.
Figure 3:
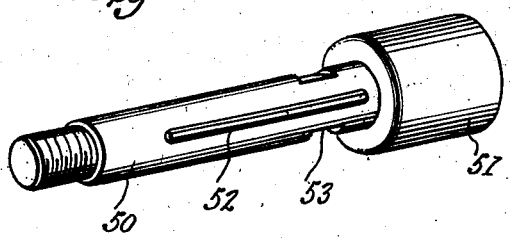
Figure 3 is a detail perspective view of one form of key shaft for carrying the expander head.

Referring now to the drawings and first to Figures 1, 2 and 3, the expander tool is provided with a body portion or frame 20 which is preferably of hollow cylindrical construction with base flanges or feet 21 adapted to be secured upon the top of a bench or table 22 by lag screws 23 or the like. From Figure 1 it will be noted that the body 20 is disposed near the edge or end of the bench 22 so that certain handle portions of the tool, hereinafter described, may be freely turned without striking the bench or endangering the operator.

The body 20 is open at its rear side but has a closure wall 24 at its front side through which is disposed an axial opening bounded by a marginal flange 25 forming a bearing or support for the hub 26 of a drive screw nut 27. The hub 26 is fitted within the flange 25 and into the opening of the closure wall 24 so that the hub 26 may turn within the flange 25 and the latter supports the hub with its drive screw nut 27 and the other parts of the tool which are threaded through the nut. The rear face of the drive screw nut 27 is recessed about the hub 26, and seated in this recess is a relatively large thrust bearing 28 of a ball and race type with one portion engaging in the drive screw nut 27 and its other portion bearing against the forward end of the flange 25. The hub 26 has an annular exterior groove 29 into which projects the tip of a set screw 30 threaded through the flange 25 for retaining the hub 26 in its bearing in the body 20.

A drive screw 31 is threaded axially through the drive screw nut 27 and extends for a considerable distance inwardly of the nut 27, and through and beyond the body or frame 20. The drive screw 31 and the nut 27 have engaging relatively coarse and strong screw threads so that under certain conditions of operation of the expander tool the turn of the nut 26 causes and endwise or axially advancement of the drive screw 31 forwardly through the nut 27.

The drive screw nut 27 is provided with a desired number of radial sockets into which are fitted handles 32 so that an operator may stand at one side of the nut 27 and turn the same by a hand over hand movement to operate the expander tool at a desired fast speed of operation and at the same time obtain the necessary leverage for the expanding operation. The forward end of the drive screw 31, adjacent the nut 27, is provided with a non-circular shank portion 33 upon which is slidably fitted a crank arm 34 having a handle 35 by means of which the arm 34 may be turned to rotate the drive screw 31. The shank 33 is of substantial length to admit the sliding of the crank arm 34 thereon toward and from the nut 27, and the screw 31 carries a stop disc 36 secured by a set screw or the like to the forward end of the drive screw to engage the crank arm 34 and confine it to the shank 33. The nut 27 is provided with a locking pin 37, which projects forwardly from the nut at one side of the drive screw 31 and in the path of the crank arm 34 when the drive screw is turned backwardly through the nut to interlock the nut 27 and drive screw 31 so that the operator may grip a handle 32 and hold the drive screw 31 from turning while applying or removing an expander head or shaft to and from the tool.

The rear side of the body or frame 20 is adapted to receive therein and thereagainst a coupling member. As shown in Figures 1 and 2 the coupling member is of the female type and provided with a freely turning ring 38 having radial projections 39 to facilitate turning of the ring when coupling and uncoupling opposed members. To accommodate the ring 38 and its projections 39, the inner end of the body 20 is provided with opposed recesses 40 which open through the inner wall of the body 20 and through the rear side thereon as shown. The body 20 carries a plurality of dowel pins 41 projecting rearwardly from the body 20 and spaced thereupon in circular order for engagement through relative large openings 42 provided in a removable thrust plate 43. The thrust plate 43 is permitted to float or settle upon the dowel pins 41 during the positioning of the coupling members and the alignment of the expander heads. The thrust plate 43 is provided with recesses 44 adapted to register with the recesses 40 in the body 20 and is also provided with an inner marginal edge portion of hexagon, octagon or another suitable shape conforming to the peripheral shape of flange 45 of the coupling member. The thrust plate 43 is also provided with a countersunk shoulder 46 against which the coupling member flange 45 is adapted to seat so as to hold the coupling member firmly during the thrust of the expander thereagainst.

The coupling member is provided with a shank 47 which is originally of reduced diameter as compared with the passage through the coupling and is adapted to receive thereover the end of a hose 48 upon which has been fitted a flanged ferrule 49, the flange of which abuts the extremity of the hose and is adapted to engage the flange 45 when the hose is slipped over the shank 47.

The drive screw 31 acts as a drag member when the tool is operating and may be of any practical length, and is shown in the present instance as extending rearwardly through the body 20 and a substantial distance therebeyond so as to dispose the rear extremity of the drive screw 31 adjacent the free end of the shank 47 of the coupling member when it is in position in the body.

The drive screw 31 carries upon its rear end a detachable expander member. The expander member is shown in Figures 1, 2, and 3 as comprising a key shaft 50 having upon one end an internally threaded socket 51 adapted to engage detachably over the threaded extremity of the drive screw 31. The shaft 50 is provided with a longitudinal key 52 intermediate its ends and is also provided with opposite flat wrench receiving faces 53 by means of which an open wrench or another suitable tool may be engaged with the shaft 50 for screwing the socket head 51 on and off the end of the drive screw 31.

An expander head 54 which, as shown in Figure 1, may comprise a substantially cylindrical block with front and rear ball sections 55 and 56 at opposite ends of the block, the front ball section 55 being of slightly less diameter than the rear ball section 56 for expanding the shank 47 in two stages, and the ball sections are proportioned in diameters to effect the desired completed expansion of the shank 47 to secure the coupling member on the end of the hose 48. The expanded head 54 is provided with an axial opening therethrough for receiving the shaft 50 and is provided with a recess in one side of the opening for the reception of the key 52. The head 54 is thus secured on the shaft 50 to hold the latter from turning during operation of the expander tool. The head 54 can be placed on the shaft 50 only in one position with its smaller end forward, or toward the socket 51, for the head 54 is internally constructed as shown in Figure 4 with the key slot 61 opening only through the smaller end of the head. The head 54 cannot be reversed on the shaft 50. A lock nut 57 is detachably threaded upon the rear end of the key shaft 50 to hold the expander head 54 against pulling off of the shaft as the head is drawn through the shank of the coupling.

In operation, a coupling member is seated in the thrust plate of the body portion against the shoulder 46 and is supported therein with the shank 47 of the coupling member extending rearwardly from the body portion. The drive screw 31 is now turned through the nut 27 by means of the hand crank 34 until the rear end of the drive screw 31 projects into the coupling member and the hand crank 34 strikes the locking pin 37 on the nut. The pin 37 holds the crank handle 34 and the drive shaft 31 against turning, the crank 34 being slid inwardly on the shank 33. The key shaft 50 may now be applied to the rear end of the drive screw 31 and the socket head 51 is turned up on the screw 31 with a tight fit by means of a wrench applied to the key shaft and as the drive screw 31 is held from turning by the locking pin 37. The expander head 54 is now fitted over the shaft 50 and the locking nut 57 is turned up by hand tightly against the rear end of the key shaft, the use of a wrench not being necessary as the thrust on the nut is only an axial or longitudinal one. The crank handle 34 is then slipped forwardly on the screw shank 33 to clear the pin 37 and is operated to turn the drive screw 31 to advance the same forwardly through the nut 27. This draws the expander head 54 into engagement with the free end of the coupling member shank 47 and with the forward ball portion 55 in wedging engagement in the end of the shank.

The end of a hose 48 is now fitted with the ferrule 49, and thus assembled, the hose and ferrule are slipped over the expander head 54 and on to the shank 47 of the coupling member. This disposes the end of the hose 48 in the annular space between the shank 47 and the ferrule 49.

The operator now uses the radial handles 32 by preferably standing at one side of the tool and working the handles, hand over hand to turn the drive screw nut 27 and draw the drive screw 31 forwardly through the nut 27, the body portion 20 and through the hose coupling member. The handles 32 are of desired length to obtain the necessary leverage or purchase upon the nut 27 so as to draw the expander head 54 through coupling shank 47 to expand the latter and compress it against the rear wall of the hose 48, the hose being thus effectively clamped between the shank and the ferrule and the coupling being thus made fast and the hose sealed in the coupling member.

After the expander head 54 has been drawn through the shank 47, it is free of the coupling member and the hose with the coupling member applied thereto may be readily pulled out of the tool. The expander head 54 is removed from the shaft or drive screw and the tool is now in condition to receive a second coupling member.

In all cases where it is desired to remove the expander member from the drive screw 31, the latter is turned through the nut sufficiently to bring the crank handle 34 opposite the locking pin 37 so that the drive screw 31 may be effectively held from turning by the handles 32 when the expander element is manipulated by the wrench or the lock to remove it from the drive screw.

In Figure 4 there is shown a modified form of expander head 54'. In this instance the body portion of the head is frusto-conical and has a cylindrical portion 58 adapted to initially center the expander head in the free end of the coupling member shank 47. The rear end of the conical head 54' is provided with a larger rear cylindrical portion 59 adapted to engage and hold the rear wall of the shank 47 in its expanded form while setting and to thus prevent the wall from shrinking back toward its normal condition. The conical expander head 54' is provided with a central shaft opening 60 and a key slot 61 similar to the opening and slot shown in Figure 1 so that the expander head 54 may be substituted upon the key shaft 50 when desired.

Figure 5 shows a modified form of the expander member. In this instance the key shaft 50' has a socket head 51' on its forward end to engage the drive screw 31 and is reduced at its rear end and provided with a key slot 62 which opens through the end of the shaft 50' for the reception of a key 63 which is carried upon a small diameter tapering or conical expander head 64, shown in detail in Figure 6, and which is adapted to be slipped over the rear end of the shaft 50'. The lock nut 65 is threaded upon the rear end of the shaft 50' to hold the expander head 64 against pulling off of the shaft during the dragging of the expander action. This construction of expander member, shown in Figures 5 and 6, is adapted particularly for small diameter hose couplings.

The advantage of the tapering expander head, such as 64 in Figures 5 and 6, over the two-ball type, shown in Figure 1, is, particularly in small diameter couplings, that the two-ball expander head does not provide sufficient frictional torque between the ball surface and the inner wall of the coupling shank during the drawing operation. As a result, the threaded drive screw 31 and the expander head turn with the nut 27 and no advancement of the head takes place. The tapering expander head provides the necessary frictional torque and prevents the head and the connected drive screw 31 from turning with the nut 27 so that the screw 31 is fed outwardly through the nut and the head 64 is drawn through the coupling shank.

The modified form of expander member shown in Figure 7 embodies a construction wherein the shaft and the head are in one piece and is also adapted for use particularly in small diameter hose coupling. In this instance, the expander head 66 is frusto-conical with the cylindrical sections 67 and 68 at its respective forward and rear ends, and with a shaft portion 69 extending forwardly from the smaller cylindrical section 67 and provided at its forward end with a reduced threaded projection 70 adapted to be turned into a threaded socket 71 which is provided in the rear end of the drive screw 31, as shown in Figures 1 and 7. The reduced threaded projection 70 is shouldered at its point of juncture with the shaft section 69 to provide a jam or lock nut engagement between the shaft section 69 and the drive screw 31. The shaft section 69 may be turned by means of a wrench applied to a nut projection 72 which is integrally formed upon the rear end of the expander head 66 to facilitate positioning and removal of this form of expander member. Thus, the various forms of expander members and heads may be interchangeably applied to the drive screw 31 for adapting the tool to various sizes of hose couplings.

It will be noted that the drive screw 31 while operated to drag the expander through the shank 47 exerts an axial thrust against the body 20, and the interposed thrust bearing 28 takes up this heavy pressure. The thrust bearing 28 is disposed between the drive screw nut 27 and the bearing flange 25 of the body portion 20 so that the thrust bearing may be of sufficient size to withstand the great pressure and to reduce frictional contact between the bearing surfaces and so that the nut 27 may be rotated with a minimum frictional resistance.

The frictional contact of the expander head 54 against the free end of the shank 47 is sufficient to hold the expander head with its shaft 50 and the drive screw 31 from turning during the rotation of the nut 27 so that there is insured a positive drag feed of the expander head through the shank. It is necessary to use the locking pin 37 only when the expander head is not frictionally held against the shank 47. The crank handle 34 is used to turn up the drive screw 31 until the expander head 54 frictionally engages the shank 47 so that the nut 27 may then be turned without rotating the drive screw 31.

While a coupling member of the female type is shown in the tool, it is apparent that a male coupling may also be placed in the tool as the threaded end merely projects into the hollow body 20. The recesses 40 and 44 in the body 20 and thrust plate 43 are utilized only to accommodate the ring projections 39 of the female coupling as shown.

It is obvious that various changes and modifications may be made in the details of construction and design of the above specifically described embodiment of this invention without departing from the spirit thereof, such changes and modifications being restricted only by the scope of the following claims.

What is claimed is:

1. An expander tool for hose couplings, comprising a supporting body open at its rear side and provided with a plurality of dowel pins in its rear side, a thrust plate having openings therein to receive the dowel pins and said openings being of larger diameter than that of said pins to admit centering of the thrust plate on the supporting body during the operation of the tool, said thrust plate adapted to receive a coupling member therein with the shank projecting rearwardly from the supporting body, a nut having a hub portion rotatably mounted through the front wall of said supporting body and provided with radial handles for operation of the nut, a thrust bearing seated in the rear side of the nut about said hub portion and engaging the front side of said supporting body to take up end thrust imposed on the nut, a drive screw threaded through the nut and extending rearwardly through the body and thrust plate, a hand crank mounted on the forward end of the drive screw for turning the latter in the nut to relatively adjust the same, a locking pin carried by the nut for engagement at times with the hand crank to hold the drive screw from turning in the nut, and an expander member threaded upon the rear end of said drive screw adapted to be adjusted against the shank of the coupling member by said hand crank and further adapted to be drawn through the shank to expand the same upon the rotation of said nut about the drive screw.

2. An expander tool for hose couplings, comprising a supporting body open and provided with a plurality of dowel pins at its rear side, a thrust plate having openings of larger diameter than and adapted to receive said dowel pins and admit centering of the thrust plate on the supporting body during operation of the tool, said thrust plate having a non-circular socket opening therein for the reception of a coupling member to hold it from turning and with its shank projecting rearwardly from the supporting body, a nut rotatably mounted on the forward side of the supporting body, a drive screw threaded in the nut and extending rearwardly for passage through the coupling member when in the thrust plate, and an expander head on the rear end of the drive screw for advancement through the shank to expand the same when said nut is turned.

3. An expander tool for hose couplings comprising a supporting body open at its rear side to receive a coupling member with its shank projecting rearwardly from the supporting body, a nut having a hub portion rotatably mounted through the front side of said supporting body and provided with radial handles for operation of the nut, a thrust bearing seated about said hub portion for engaging the front side of the supporting body to take up end thrust imposed on the nut and admit relatively easy turning of the nut, a drive screw threaded through the nut and extending rearwardly through the supporting body, an expander member threaded on the rear end of said drive screw, a hand crank mounted on the forward end of the drive screw for turning the latter in the nut to initially advance the expander member against the shank of the coupling member, and a locking pin carried by the nut for engagement at times with the hand crank to hold the drive screw from turning in the nut during the threading of the expanding member upon the rear end of the drive screw.

4. An expander tool for hose couplings, comprising a supporting body open at its rear side, a thrust plate detachably mounted against the rear side of the supporting body and having a supporting shoulder and an inner configuration adapted for the reception of a coupling member to support the latter with its shank extending rearwardly from the thrust plate, a nut having a hub portion mounted to turn in the forward side of said supporting body and provided with radial handles for turning the nut, a thrust bearing interposed between the nut and the forward side of the supporting body to take up end thrust imposed on the nut, a drive screw threaded through the nut adapted to be advanced forwardly therethrough when the nut is turned, an expander element threaded upon the rear end of said screw adapted to be drawn through the shank of the coupling member by the forward movement of the screw, manual means connected to the drive screw for quickly turning the same and setting the expander element against the outer end of the shank, and interlocking means between the nut and the manual means for securing the drive screw non-rotatably to the nut.

5. An expander tool for hose couplings comprising a supporting body having an open end and an abutment face, a thrust plate, interfitting means between said plate and body whereby said plate may be attached by an axial slip fit to the open end of said body and against said abutment face as a stop and retained against rotation relative to said body, said thrust plate provided with a further means to receive a coupling by an axial slip fit and prevent relative rotation of the coupling to the body during the expanding operation, a nut rotatably mounted in the opposite end of the body, a drive screw threaded into the nut and extending through said coupling member when retained in said thrust plate, and an expander head on the inner end of the drive screw adapted to be drawn through the coupling to expand the same when said nut is turned.

6. A tool according to claim 5 wherein said interfitting means between said thrust plate and said body is of relative loose nature to permit a slight lateral movement relative to the body to permit centering of said plate and the supported coupling during the operation of the tool.

ALLAN C. HOFFMAN.